Patented July 14, 1925.

1,545,508

UNITED STATES PATENT OFFICE.

ROBERT J. MONTGOMERY, OF ROCHESTER, NEW YORK, ASSIGNOR TO BAUSCH & LOMB OPTICAL COMPANY, OF ROCHESTER, NEW YORK, A CORPORATION OF NEW YORK.

GLASS AND COMPOSITION THEREFOR.

No Drawing. Application filed April 2, 1923. Serial No. 629,423.

*To all whom it may concern:*

Be it known that I, ROBERT J. MONTGOMERY, a citizen of the United States, residing at Rochester, in the county of Monroe and State of New York, have invented certain new and useful Improvements in Glass and Composition Therefor; and I do hereby declare the following to be a full, clear, and exact description of the same.

My invention relates to improvements in the composition of that kind of glass which is known to those skilled in the art as ordinary crown glass, whether it contains lime or not. By the term "ordinary crown glass" in this specification is meant one which is suitable for optical and ophthalmic purposes in which the main constituents are (1) silica (2) alkali (sodium oxide or potassium oxide) (3) a material to give physical stability to the glass and allow the control of the index of refraction and dispersion of the glass. Calcium oxide and antimony oxide (in amounts totaling from 10% to 20%) will do this. Antimony oxide serves the double purpose of aiding in the control of the stability and of the optical properties as well as obtaining the improvement disclosed in this patent. (4) Control oxides as boron oxide and arsenic oxide to aid in the melting and refining of the glass. (5) Small amounts of other materials such as zinc oxide, lead oxide, and barium oxide, may be included without exceeding this definition of ordinary crown glass.

The object of my invention is first to obtain a glass which will not change color to any appreciable extent when exposed to sunlight for a considerable period and second to obtain better melting and fining behavior.

It is well known that the ordinary crown glass, which includes sheet glass, blown glass, pressed glass and other forms of glassware made from glass of this type, will change color when exposed to sunlight for a considerable period. For many uses this color change is very undesirable. It increases the light absorption, decreases the utility and detracts from the appearance of the glass. Examples of this are sheet glass, either plate or window glass, glass for spectacle lenses and other optical goods, lamp globes, bulbs, shades, etc.

I have discovered that the introduction of an amount of antimony oxide in this type of glass in excess of one percent will materially reduce the tendency of the glass to change color or develop color when exposed to sunlight and aids in melting the glass and clearing it from bubbles, giving a better quality of glass than when it is not used.

The following composition (No. 1) is a preferred one. It being understood that I do not limit myself to these proportions but may vary the $Sb_2O_3$ content from 1.0% to 20%.

|  | 1 | 2 | 3 | 4 | 5 |
|---|---|---|---|---|---|
| $SiO_2$ | 72.0 | 67.0 | 65.6 | 72.5 | 66 |
| $Na_2O$ | 14.7 | 13.6 | 13.6 | 15.0 | 14 |
| $CaO$ | 10.5 | 9.7 | 0.0 | 10.5 | 0.0 |
| $B_2O_3$ | 0.3 | 0.3 | 0.3 | 0.0 | 0.0 |
| $Sb_2O_3$ | 2.0 | 8.9 | 20.0 | 2.0 | 20.0 |
| $As_2O_3$ | 0.5 | 0.5 | 0.5 | 0.0 | 0.0 |
|  | 100.0 | 100.0 | 100.0 | 100.0 | 100.0 |

Compositions 2 to 5 are examples of melts I have made which are embodiments of my invention. However, I do not limit myself to these exact proportions or materials but may vary each constituent or add small amounts of other constituents such as barium oxide, lead oxide, zinc oxide, etc. or substitute potassium for sodium in part or in whole, to control the melting behavior, the optical properties or the co-efficient of expansion. The only limit is that the glass is essentially a crown glass as above defined in which 1 to 20% of antimony is introduced. The calcium oxide may be reduced to 0.0 in order to keep the index of refraction as low as possible. $As_2O_3$ may be reduced or not used at all. In some cases I prefer not to use $As_2O_3$ as better quality of glass and greater freedom from color change can be obtained, when exposed to sunlight.

I have discovered that when arsenic alone is introduced in a glass of this type to improve the quality the color change on exposure to sunlight is marked if no antimony is employed, and that by the use of antimony oxide as herein stated it is unnecessary to use arsenic to improve the quality but if it is deemed desirable to use arsenic for any purpose the antimony oxide will counteract the deleterious effect of a certain small amount of arsenic, as for instance is shown in composition No. 1 above.

It is the fact that if a coloring oxide is introduced into a base glass which will change color when exposed to sunlight, this color change in the glass will cause a change in the composition as a whole which is not entirely due to the coloring oxide introduced, but with crown glass in which 1 to 20% of antimony oxide is introduced as herein described as there is no appreciable color change in the glass caused by sunlight. The true or derived colors of the coloring oxide if one is employed, can be imparted to the composition.

It follows therefore that my invention comprehends a glass composition colored by the use of a coloring oxide suitable for the purpose required. The constituents mentioned in the various formulæ given above, may be varied in the manner known to those skilled in the art to properly control the optical properties, the physical properties or the coefficient of expansion as these may be affected by the coloring oxide or oxides introduced.

While I believe that the composition produced by the above formulæ does as a matter of fact contain the chemicals used to form it and to obtain the properties desired, it is somewhat difficult to determine the fact by analysis and my invention therefore comprehends the process described as well as the material itself.

I claim as my invention:

1. A crown glass comprising antimony oxide in excess of one percentum and less than twenty percentum.

2. A crown glass composition comprising as its essential components silicon oxide, sodium oxide and antimony oxide in proportions varying from one to twenty percentum.

3. A crown glass composition comprising as its essential components silicon oxide, sodium oxide and antimony oxide, the latter comprising from one to twenty percentum of the whole, and a coloring oxide.

4. In the process of making crown glass embodying as its essential ingredients silicon oxide and sodium oxides, the improved step consisting in the addition to the mixture of antimony oxide in excess of one percentum and less than twenty-one percentum.

5. An improved glass composition comprising the following ingredients in substantially the following proportions:

| | Per cent. |
|---|---|
| Silicon oxide | 72 |
| Sodium oxide | 14+ |
| Calcium oxide | 10+ |
| Boron oxide | .3 |
| Antimony oxide | 2 to 3 |
| Arsenic oxide | .5 |

ROBERT J. MONTGOMERY.